(12) United States Patent
Takizawa

(10) Patent No.: US 8,604,738 B2
(45) Date of Patent: Dec. 10, 2013

(54) METHOD OF AND APPARATUS FOR CONTROLLING OIL TEMPERATURE INCREASE FOR ELECTRIC VEHICLE AND ELECTRIC VEHICLE

(75) Inventor: Daijiro Takizawa, Utsonomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 517 days.

(21) Appl. No.: 12/911,319

(22) Filed: Oct. 25, 2010

(65) Prior Publication Data

US 2011/0095717 A1     Apr. 28, 2011

(30) Foreign Application Priority Data

Oct. 26, 2009 (JP) ................. 2009-245516

(51) Int. Cl.
*G05B 5/00*  (2006.01)
*G05D 23/00* (2006.01)
*H02H 7/08*  (2006.01)

(52) U.S. Cl.
USPC ............................ 318/473; 318/783; 318/480

(58) Field of Classification Search
USPC ......................................... 318/473, 783, 480
See application file for complete search history.

(56) References Cited

U.S. PATENT DOCUMENTS

2009/0127954 A1   5/2009   Mogi

FOREIGN PATENT DOCUMENTS

| JP | 9-275696    | 10/1997 |
| JP | 3918631     | 2/2007  |
| JP | 2008-43094  | 2/2008  |
| JP | 2008-206329 | 9/2008  |
| JP | 2008-278557 | 11/2008 |
| JP | 2009-121549 | 6/2009  |
| JP | 2009-224256 | 10/2009 |
| JP | 2009-254105 | 10/2009 |

OTHER PUBLICATIONS

Japanese Office Action for Application No. 2009-245516, dated Aug. 23, 2011.

*Primary Examiner* — Erick Glass
(74) *Attorney, Agent, or Firm* — Nelson Mullins Riley & Scarborough LLP

(57) ABSTRACT

An electric vehicle employs an oil commonly used as a lubricating oil for gears and a coolant for a motor and is propelled by transmitting the rotational torque of the motor to wheels through the gears, the motor being partly immersed in the oil. It is determined whether the motor is in a state prior to being started or not. If it is judged that the motor is in the state prior to being started, coils of the motor are energized alternately with a first current supplied to the motor at an advanced angle for no torque to generate a magnetic flux, and a second current supplied to the motor at another advanced angle for no torque to generate a magnetic flux in a direction opposite to the magnetic flux generated by the first current, thereby heating the oil.

6 Claims, 9 Drawing Sheets

METHOD OF AND APPARATUS FOR CONTROLLING OIL TEMPERATURE INCREASE FOR ELECTRIC VEHICLE AND ELECTRIC VEHICLE

CROSS-REFERENCE TO RELATED APPLICATION

This application is based upon and claims the benefit of priority from Japanese Patent Application No. 2009-245516 filed on Oct. 26, 2009, of which the contents are incorporated herein by reference.

BACKGROUND OF THE INVENTION

1. Field of the Invention

The present invention relates to an electric vehicle which is propelled by an electric motor (hereinafter referred to as "motor") energized by electric power when the rotational torque generated by the motor is transmitted to wheels through gears, and more particularly to a method of and an apparatus for controlling an oil temperature increase for an electric vehicle which employs an oil commonly used as a lubricating oil for the gears and a coolant for the motor, and an electric vehicle incorporating such a method and an apparatus.

2. Description of the Related Art

Heretofore, there have been commercially available electric vehicles which are propelled by a motor energized by electric power when the rotational torque generated by the motor is transmitted to wheels through a gear train.

The motor on such electric vehicles comprises, for example, a permanent-magnet synchronous motor including a rotor made up of a plurality of permanent magnets disposed circumferentially around a rotor core (iron core) and a stator having a plurality of coils disposed around respective stator core (iron core) teeth radially spaced from the permanent magnets.

The permanent-magnet synchronous motor has a magnetic pole sensor for detecting the positions of the permanent magnets of the rotor. The coils are supplied with three-phase alternating currents at advanced angles to produce a rotating magnetic field from the stator, thereby rotating the rotor.

Since the rotor is connected to a rotational shaft, the rotational torque of the rotor is transmitted through the rotational shaft to a gear train, i.e., a power train, and then to the wheels of the electric vehicle.

The gear train includes some gears that are housed, together with the motor, in a casing which contains an oil therein. The oil usually stays in vertically lower portion of the casing. When the gears in the casing rotate, the oil is driven upwardly to regions in the casing which are to be supplied with the oil. For details, reference should be made to Japanese Patent No. 3918631 and Japanese Laid-Open Patent Publication No. 2009-121549 (U.S. Patent Application Publication No. 2009/0127954 A1).

The regions in the casing which are to be supplied with the oil include meshing portions of the gears, sliding portions of the shaft, etc. When the oil is supplied to those regions in the casing, the meshing portions of the gears, the sliding portions of the shaft, etc. are lubricated and cooled by the oil.

The oil changes its viscosity in response to the temperature changes. When the viscosity of the oil increases as the temperature thereof decreases, the torque (driving torque) applied by the gears to drive the oil upwardly increases, resulting in an increase in the resistance to the rotation of the motor that is operatively coupled to the gears. The increase in the resistance to the rotation of the motor tends to reduce the efficiency of the motor, i.e., the efficiency with which to convert electric power into motor power and the efficiency with which to convert electric power into drive power for the wheels.

According to Japanese Patent No. 3918631, if the temperature of the oil is lower than a given temperature when the gearshift is placed in a parking position, then the coils of the stator are supplied with an electric current for producing no torque (0 N·m). The coils are now heated by the Joule heat to warm the oil for thereby lowering the viscosity of the oil.

For quickly starting the motor, it is preferable to increase the temperature of the oil quickly to a certain temperature.

According to Japanese Patent No. 3918631, the coils of the stator are supplied with an electric current for producing no torque (0 N·m) so that the coils are heated by the Joule heat due to their copper loss thereby to warm the oil, as described above. However, since the upper temperature limit of the coils is governed by the upper temperature limit (about 200° C.) of the wire insulations of the coils, there is a certain limitation to the upper rate at which the temperature of the coils rises, i.e., a certain limitation to the shorter time required to increase the temperature of the coils. In other words, it is difficult to warm cold oil quickly to a certain desired temperature. Particularly, when the motor is to be started at low temperatures such as an ambient air temperature at or below the freezing point, it will take a considerable time to warm the oil up to a desired temperature. Consequently, the oil temperature control technique according to the related art still remains to be improved.

SUMMARY OF THE INVENTION

It is an object of the present invention to provide a method of and an apparatus for controlling an oil temperature increase for an electric vehicle to warm the oil quickly when the temperature of the oil is equal to or lower than a prescribed temperature, and an electric vehicle incorporating such a method and an apparatus. The present invention is particularly preferable for applications at low temperatures such as an ambient air temperature at or below the freezing point.

According to the present invention, there is provided a method of controlling an oil temperature increase for an electric vehicle which employs an oil commonly used as a lubricating oil for gears and a coolant for a motor and which is propelled by transmitting the rotational torque of the motor to wheels through the gears, the method comprising the steps of determining whether the motor is in a state prior to being started or not, and if it is judged that the motor is in the state prior to being started, energizing coils of the motor alternately with a first current supplied to the motor at an advanced angle for no torque to generate a magnetic flux, and a second current supplied to the motor at another advanced angle for no torque to generate a magnetic flux in a direction which is different from the magnetic flux generated by the first current.

According to the above method, before the electric vehicle is started to operate, the coils of the motor are energized alternately with a first current supplied to the motor at an advanced angle for no torque to generate a magnetic flux, and a second current supplied to the motor at an advanced angle for no torque to generate a magnetic flux in a direction which is opposite to the magnetic flux generated by the first current. The coils are heated due to a copper loss thereof, and a stator core of the motor is heated due to an iron loss thereof, thereby quickly heating the oil by both the coils and the stator core. The present invention is particularly preferable for applications at low temperatures such as an ambient air temperature at or below the freezing point.

The motor may comprise a three-phase permanent-magnet synchronous motor, and the advanced angle at which the first current is supplied may be 90° and the other advanced angle at which the second current is supplied may be 270°.

When the first electric current is supplied to the motor at the advanced angle of 90°, the coils generate magnetic fluxes opposite to the magnetic fluxes generated by permanent magnets of the motor, thereby demagnetizing the permanent magnets. The second current may have a value greater than that of the first current, or a period for which the coils are energized with the second current at the other advanced angle of 270° may be longer than a period for which the coils are energized with the first current at the advanced angle of 90°, so that the permanent magnets are prevented from being demagnetized.

It may be judged that the motor is in the state prior to being started if a parking brake of the electric vehicle is in operation or a transmission of the electric vehicle is in a parking position. Thus, the oil can be heated while the electric vehicle is being reliably stopped.

A timer may be further provided for setting a start time to start the electric vehicle, and if the timer sets a next start time to start the electric vehicle, the coils may be energized so as to equalize the temperature of the oil to a proper temperature at the set next start time. The electric power required to heat the oil can thus be consumed efficiently.

The electric vehicle may be connected to an external charging unit before the electric vehicle is started to operate, and the first current and the second current may be supplied from an external charging unit to the motor. Consequently, before the electric vehicle is started to operate, the oil can be heated while an electric storage device on the electric vehicle is being charged.

The electric vehicle to which the above method of controlling an oil temperature increase is applied is also covered by the present invention.

According to the present invention, there is also provided an apparatus for controlling an oil temperature increase for an electric vehicle which employs an oil commonly used as a lubricating oil for gears and a coolant for a motor and which is propelled by transmitting the rotational torque of the motor to wheels through the gears, the apparatus comprising a decision unit for determining whether the motor is in a state prior to being started or not, and an energization controller for, if it is judged that the motor is in the state prior to being started, energizing coils of the motor alternately with a first current supplied to the motor at an advanced angle for no torque to generate a magnetic flux, and a second current supplied to the motor at another advanced angle for no torque to generate a magnetic flux in a direction which is different from the magnetic flux generated by the first current.

According to the above apparatus, before the electric vehicle is started to operate, coils of the motor are energized alternately with a first current supplied to the motor at an advanced angle for no torque to generate a magnetic flux, and a second current supplied to the motor at another advanced angle for no torque to generate a magnetic flux in a direction which is different from the magnetic flux generated by the first current. The coils are heated due to a copper loss thereof, and a stator core of the motor is heated due to an iron loss thereof, thereby quickly heating the oil by both the coils and the stator core.

According to the present invention, as described above, in the electric vehicle which employs an oil commonly used as a lubricating oil for gears and a coolant for a motor and which is propelled by transmitting the rotational torque of the motor to wheels through the gears, if the temperature of the oil is equal to or lower than a prescribed temperature, then the coils of the motor are energized alternately with a first current supplied to the motor at an advanced angle for no torque to generate a magnetic flux, and a second current supplied to the motor at another advanced angle for no torque to generate a magnetic flux in a direction which is different from the magnetic flux generated by the first current. Thus, the coils are heated due to a copper loss thereof, and a stator core of the motor is heated due to an iron loss thereof, thereby quickly heating the oil by both the coils and the stator core. Therefore, the electric vehicle can smoothly be started to operate at low temperatures such as an ambient air temperature at or below the freezing point.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A method of and an apparatus for controlling an oil temperature increase for an electric vehicle, and an electric vehicle incorporating such a method and an apparatus according to an embodiment of the present invention will be described below with reference to the accompanying drawings.

Figure 1:
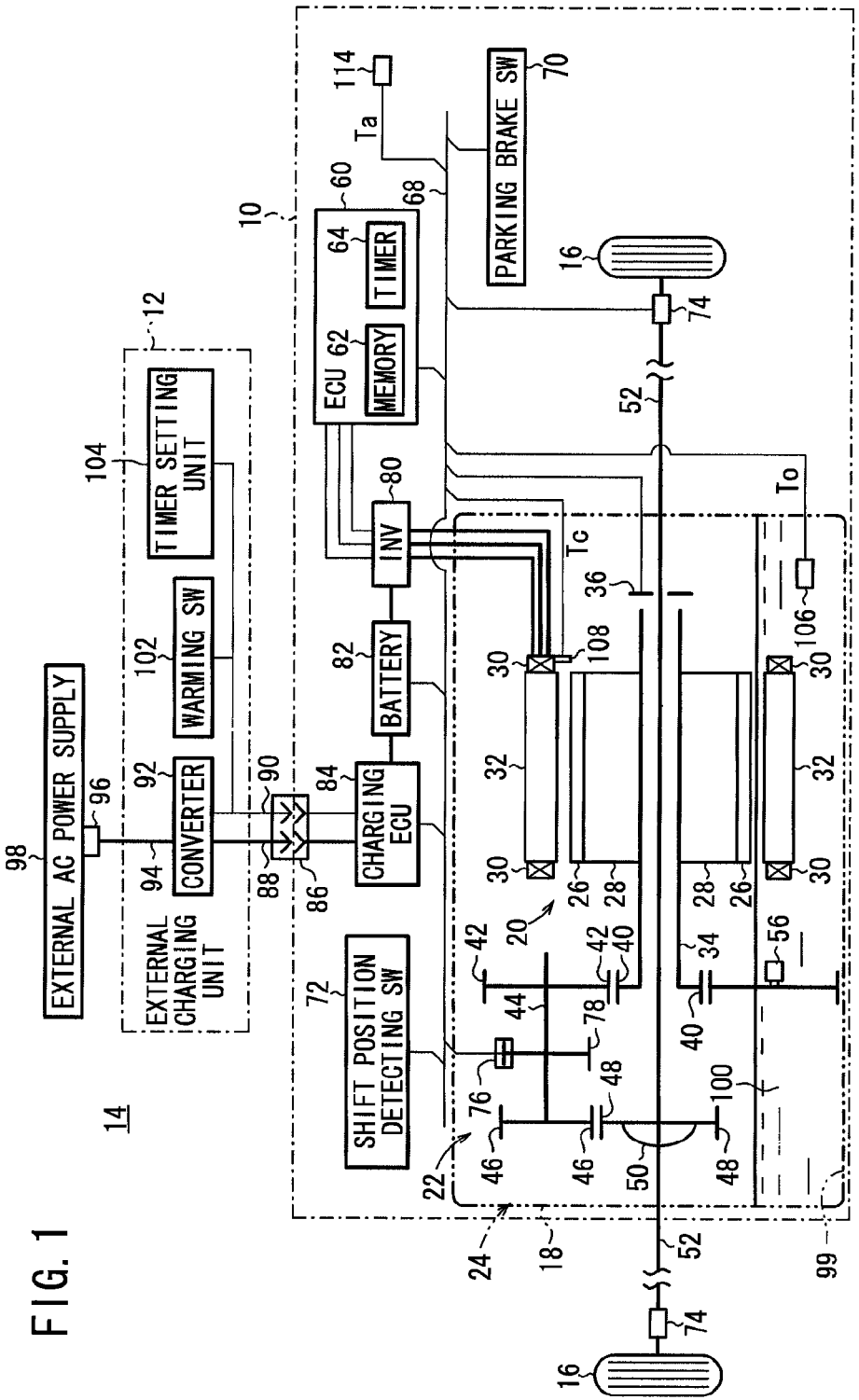
FIG. 1 is a schematic view diagram, partly in block form, of an electric vehicle system including a plug-in electric vehicle and an external charging unit according to an embodiment of the present invention.
Figure 2:
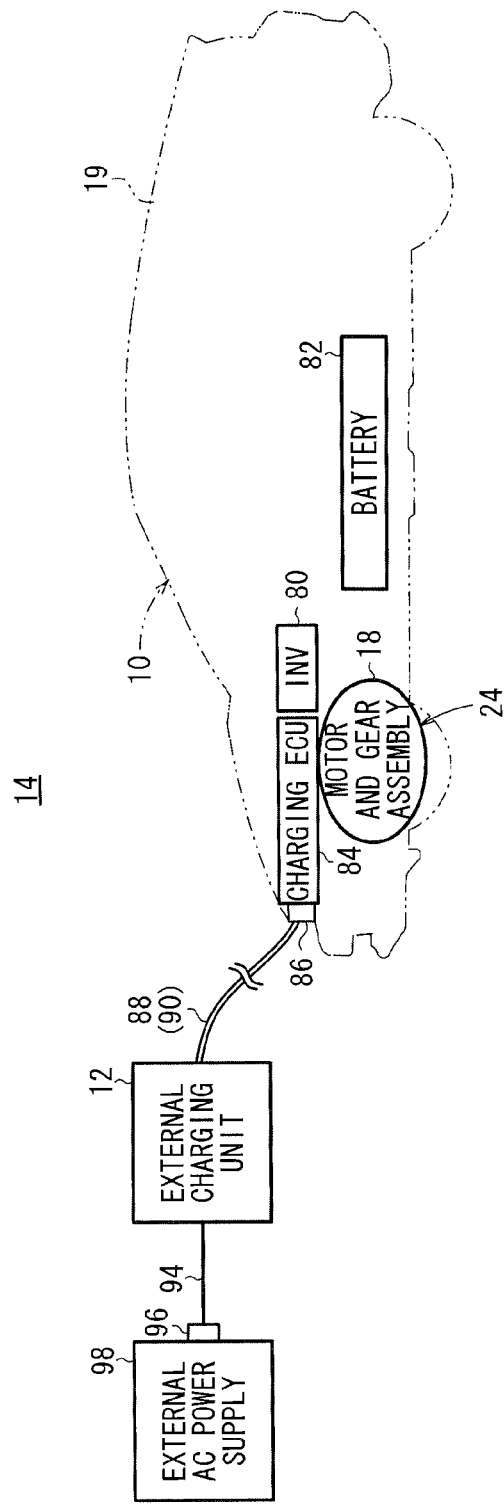
FIG. 2 is a block diagram showing the electric vehicle system.

FIG. 1 is a schematic view diagram, partly in block form, of an electric vehicle system 14 including a plug-in electric vehicle 10 and an external charging unit 12 according to an embodiment of the present invention. FIG. 2 is a block diagram showing the electric vehicle system 14.

As shown in FIGS. 1 and 2, the electric vehicle 10 includes a vehicle body 19 having a casing 18 disposed in a front lower portion thereof. The casing 18 houses therein a motor and gear assembly 24 comprising a motor 20 and a gear train 22. The mechanical and operational details of the motor and gear assembly 24 are disclosed in Japanese Laid-Open Patent Publication No. 2009-121549 (U.S. Patent Application Publication No. 2009/0127954 A1).

The motor 20 comprises a three-phase permanent-magnet synchronous motor including a rotor 28 made up of a plurality of permanent magnets 26 disposed circumferentially around a rotor core (rotor iron core) and a stator 32 having a plurality of coils 30 wound around respective stator core (stator iron core). The coils 30 serve to generate a three-phase rotating magnetic field. The rotor 28 is fixedly mounted on a hollow rotational shaft (main shaft) 34. The rotational shaft 34 has, on one end thereof, a resolver (magnetic pole position sensor) 36 for detecting the positions of the magnetic poles of the permanent magnets 26 of the rotor 28.

The rotational shaft 34 has, on the other end thereof, a primary speed-reducer drive gear 40 held in mesh with a primary speed-reducer driven gear 42. The primary speed-reducer driven gear 42 is mounted on one end of a rotational shaft 44 which has, on its other end, a secondary speed-reducer drive gear 46. The secondary speed-reducer drive gear 46 is held in mesh with a secondary speed-reducer driven gear 48.

The secondary speed-reducer driven gear 48 serves to rotate a differential gear 50. The differential gear 50 causes left and right drive shafts 52 connected thereto to rotate wheels 16 of the electric vehicle 10. One of the drive shafts 52 extends axially through the rotational shaft 34 and is connected to the corresponding wheel 16.

A trochoidal pump 56 is held in mesh with the primary speed-reducer drive gear 40. The trochoidal pump 56 includes a main body, and the stator 32 has a lower portion as shown in FIG. 1. The main body of the trochoidal pump 56 and the lower portion of the stator 32 are immersed in an oil 100 retained in a lower oil reservoir 99 in the casing 18 (i.e., the motor 20 is partly immersed in the oil 100). When the motor 20 is energized, the rotational shaft 34 rotates, causing the trochoidal pump 56 to pump the oil 100 upwardly from the oil reservoir 99. The oil 100 pumped up from the oil reservoir 99 is supplied through an oil passage, not shown, to the motor 20, meshing gear portions, and bearings, not shown, in the casing 18. After having lubricating and cooling the motor 20, the meshing gear portions, and the bearings, the oil 100 returns to the oil reservoir 99.

The electric vehicle 10 includes an ECU (controller) 60 for controlling the electric vehicle 10 in its entirety. The ECU 60 comprises a CPU, not shown, a memory (storage device) 62, a timer (time measuring device) 64, and various other drive units, not shown.

The ECU 60 is connected to a communication line 68 which is connected to a parking brake switch 70 associated with a parking brake lever, not shown, and a shift position detecting switch 72 associated with the shift lever of a transmission, not shown, of the electric vehicle 10. When the parking brake lever is turned on or in operation, the parking brake switch 70 detects the on-state of the parking brake lever. At this time, the ECU 60 energizes parking brake lever actuators 74 to apply a parking brake on the wheels 16. The shift position detecting switch 72 detects one of the shift lever positions, i.e., a parking position P, a reverse position R, a neutral position N, and a drive position D. When the shift position detecting switch 72 detects the parking position P, the ECU 60 energizes a parking actuator 76 to stop rotation of a parking gear 78 which rotates in unison with the rotational shaft 44 of the primary speed-reducer driven gear 42.

The coils 30 of the motor 20 are supplied with three-phase drive currents from an inverter 80 that is controlled by the ECU 60. The inverter 80 has a DC input terminal connected to a battery (electric storage device) 82 such as a lithium ion secondary battery or the like. The inverter 80 also has drive terminals for being supplied with three-phase drive signals from the ECU 60. When the inverter 80 is energized by three-phase drive signals from the ECU 60, the inverter 80 converts DC power from the battery 82 into three-phase high-frequency alternating drive currents, which are then supplied to the coils 30, i.e., the coils 30 grouped in U, V, and W phases.

The battery 82 has an input terminal connected to an end of a detachable connector 86 through a charging ECU 84. The detachable connector 86 has the other end connected to an output terminal of a converter 92 of the external charging unit 12 through an electric power cable 88 that is combined with a signal cable 90. The converter 92 has an input terminal connected through an electric power cable 94 to an AC plug 96. The AC plug 96 can be removably connected to an external AC power supply 98 in a home, a charging stand, or the like. According to the present embodiment, it is assumed that the AC plug 96 is connected to the external AC power supply 98 and the electric vehicle 10, i.e., the motor 20, is in a state prior to being started.

The external charging unit 12 includes, in addition to the converter 92, an ECU (not shown), a warming switch 102 for indicating whether or not a warming process for increasing the temperature of the oil 100 is to be carried out at the time of starting of the electric vehicle 10, and a timer setting unit 104 for setting a time to start the electric vehicle 10.

The energized state of the converter 92, the on/off state of the warming switch 102, the time set by the timer setting unit 104 are read into the ECU 60 via the signal cable 90, the connector 86, the charging ECU 84, and the communication line 68. The external charging unit 12 may be partly or wholly incorporated in the electric vehicle 10.

In the present embodiment, when the warming switch 102 is turned on before the electric vehicle 10 is started, the non-illustrated ECU of the external charging unit 12 and the charging ECU 84 communicate with the ECU 60, and the ECU 60 automatically performs a process of controlling a temperature rise of the oil 100 from the time before the electric vehicle 10 is started up to the time when the electric vehicle 10 is started.

The casing 18, which includes the motor and gear assembly 24 of the electric vehicle 10, also houses therein an oil temperature sensor 106 for detecting an oil temperature To, i.e., the temperature of the oil 100 in the oil reservoir 99, and a coil temperature sensor 108 for detecting a coil temperature Tc, i.e., the temperature of the coils 30.

The electric vehicle 10 has an ambient air temperature sensor 114 for detecting an ambient air temperature Ta, i.e., the temperature of the ambient air around the electric vehicle 10. The oil temperature To, the coil temperature Tc, and the ambient air temperature Ta are read into the ECU 60 via the communication line 68.

Figure 3:
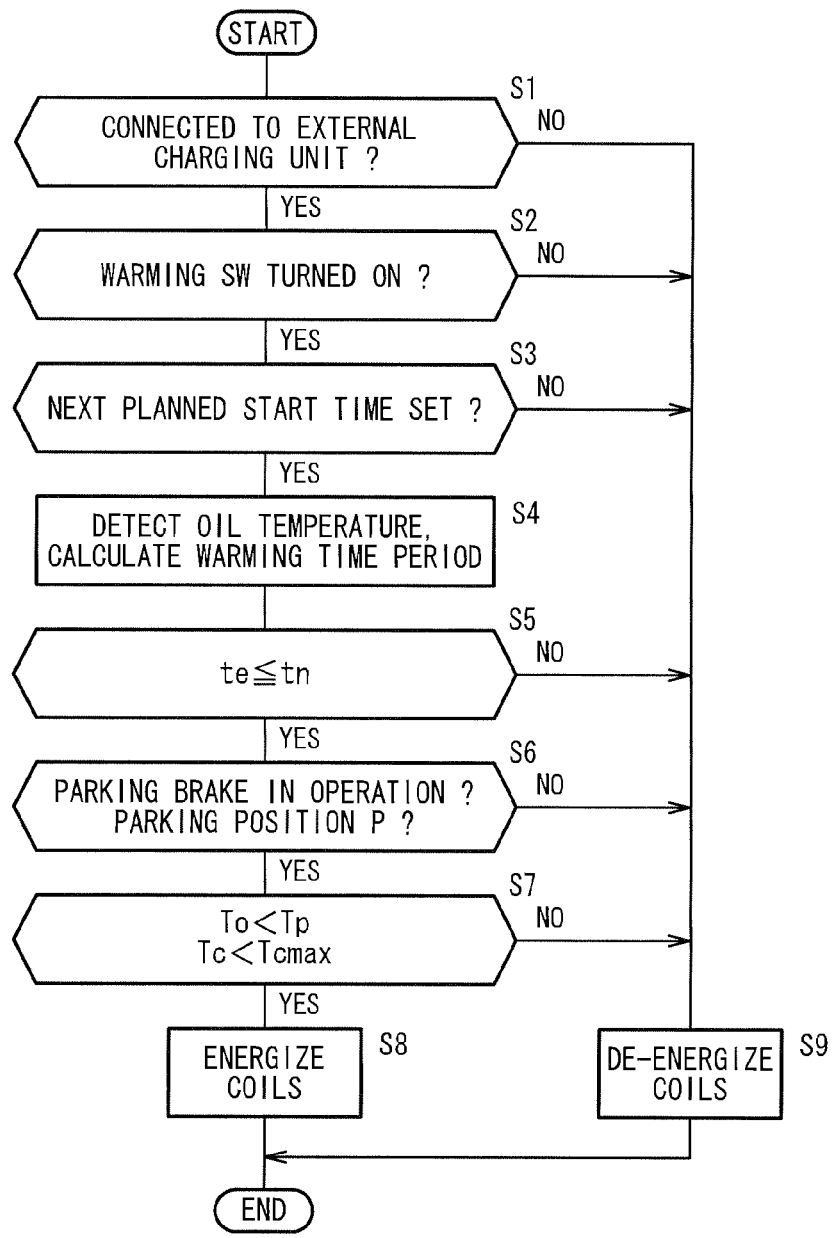
FIG. 3 is a flowchart of a processing sequence of a method of controlling an oil temperature increase for the electric vehicle according to the embodiment of the present invention.

The electric vehicle system 14 is basically constructed and operates as described above. The process of controlling a temperature rise of the oil 100 from the time before the electric vehicle 10 is started up to the time when the electric vehicle 10 is started will be described below with reference to a flowchart shown in FIG. 3.

In step S1, the ECU 60 monitors through the charging ECU 84 whether the connector 86 is connected to the external charging unit 12 or not.

If the ECU 60 judges that the connector 86 is connected to the external charging unit 12 by detecting a charging voltage supplied from the converter 92, then the ECU 60 monitors in step S2 whether the warming switch 102 (oil temperature rise controlling process start indicator) for starting the process of controlling a temperature rise of the oil 100 is turned on or not.

If the ECU 60 judges that the warning switch 102 is turned on, then the ECU 60 determines in step S3 whether a next planned start time (planned start date and planned start time) is set (input) by the timer setting unit 104 or not. For example, according to the present embodiment, if the user, such as the driver, of the electric vehicle 10 connects the external charging unit 12 to the electric vehicle 10 in the evening or at night, the process of controlling a temperature rise of the oil 100 is carried out to equalize the oil temperature To to a prescribed temperature Tp to be described later and to fully charge the battery 82 at a desired planned start time in the next morning. The explanation of a process of charging the battery 82 is omitted.

If the ECU 60 judges that a next planned start time is set by the timer setting unit 104, then the ECU 60 sets the timer 64 to the next planned start time, i.e., a time period to up to the time to start the electric vehicle 10 next. In step S4, the ECU 60 detects the oil temperature To which represents the present temperature of the oil 100 in the casing 18 with the oil temperature sensor 106.

In step S4, the ECU 60 also calculates a time period (warming time period) te for which the coils 30 need to be energized in order to increase the oil temperature To up to the prescribed temperature Tp at which the viscosity of the oil 100 is equal to or lower than a prescribed value. The time period te for which the coils 30 need to be energized can uniquely be determined from the difference between the present oil temperature To and the prescribed temperature Tp once an energizing process, to be described later, is determined. The relationship between the difference between the present oil temperature To and the prescribed temperature Tp and the time period te for which the coils 30 need to be energized is stored as a table, a map, or a formula in the memory 62. The table should preferably have a plurality of ambient air temperatures Ta as a parameter.

If the calculated time period te is equal to or smaller than the time period to set by the timer setting unit 104 and stored in the memory 62 in step S5, then the ECU 60 determines in step S6 whether or not the parking brake switch 70 is turned on, i.e., the parking brake lever is operated, or whether or not the shift position detecting switch 72 indicates the parking position P.

If the parking brake switch 70 is turned on or if the shift position detecting switch 72 indicates the parking position P in step S6, then the ECU 60 determines in step S7 whether the oil temperature To is lower than the prescribed temperature Tp or not and whether the coil temperature Tc is lower than an upper-limit coil temperature Tcmax or not. If the oil temperature To is lower than the prescribed temperature Tp and the coil temperature Tc is lower than the upper-limit coil temperature Tcmax in step S7, then the ECU 60 energizes the coils 30 in step S8.

If the answer to either one of steps S1, S2, S3, S5, S6, S7 is negative, then the ECU 60 de-energizes the coils 30 in step S9.

1st EXAMPLE

A process of energizing the coils 30 according to a first example will be described below with reference to FIGS. 4, 5, 6, and 7.

Figure 4:
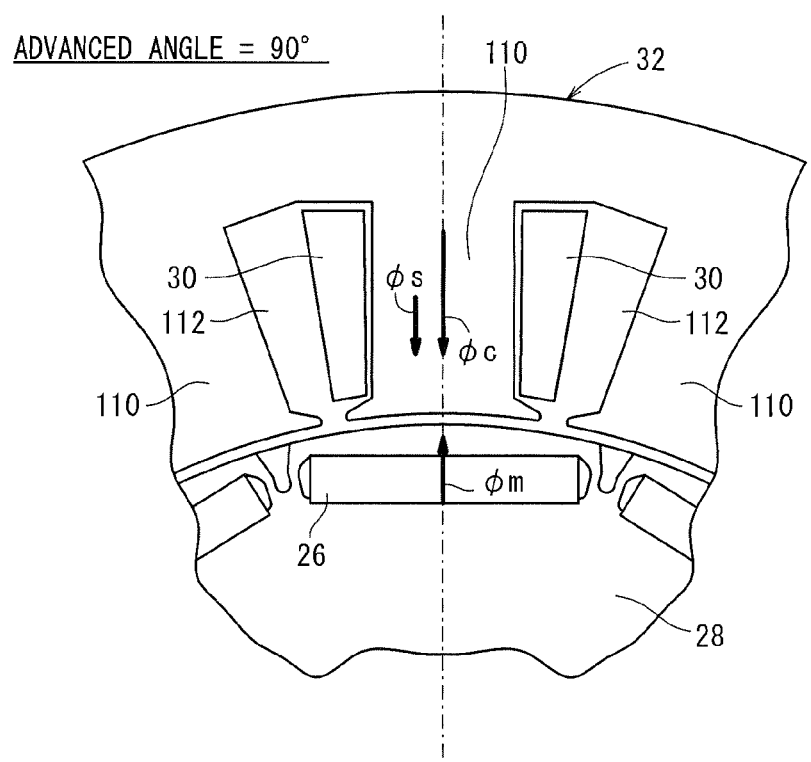
FIG. 4 is an explanatory view of magnetic fluxes generated when a coil of a stator is supplied with an electric current at an advanced angle of 90°.
Figure 5:
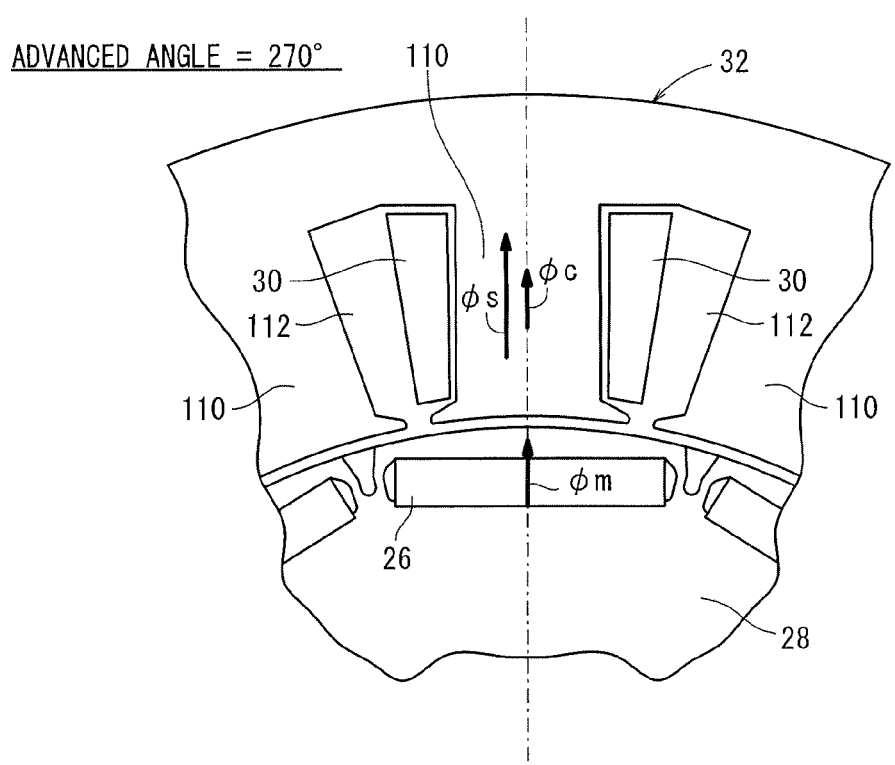
FIG. 5 is an explanatory view of magnetic fluxes generated when the coil of the stator is supplied with an electric current at an advanced angle of 270°.
Figure 6:
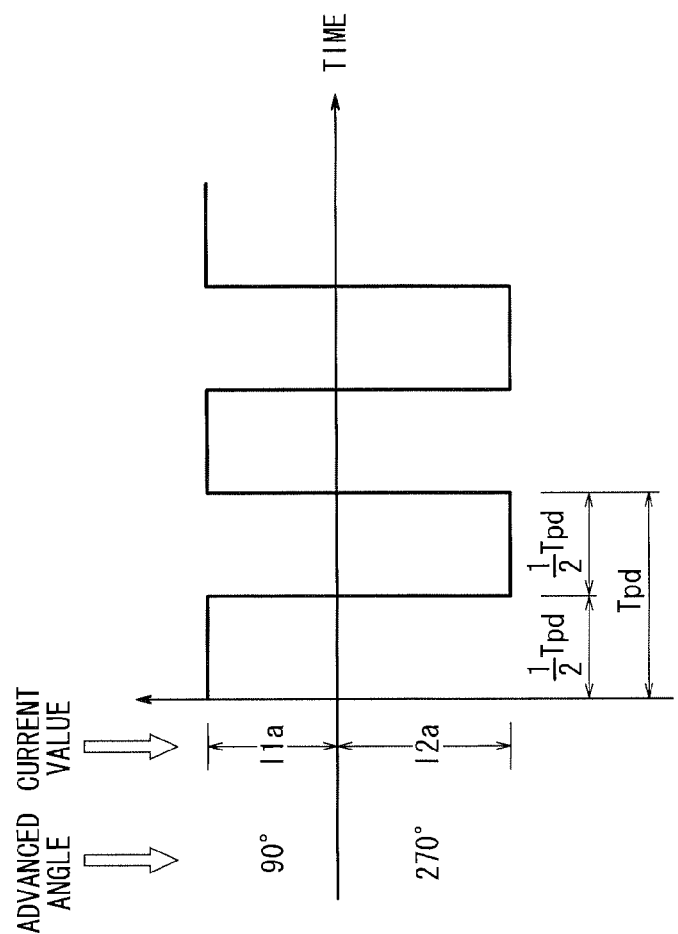
FIG. 6 is a graph illustrative of the manner in which the coil is alternately supplied with electric currents of different values at respective advanced angles of 90° and 270° at the same duty ratio.

In FIGS. 4 and 5, the position of each permanent magnet 26 on the rotor 28, which is detected by the resolver 36, is held in alignment with the central position between two adjacent slots 112 in the stator 32, i.e., the rotational torque of the rotor 28 is nil (0 N·m). In this position, as shown in FIGS. 4 and 6, the coil 30 wound around a stator core tooth 110 between the slots 112 is energized in first one-half ½·Tpd of a given periodic cycle Tpd (given frequency) by an electric current having a value I1a at an advanced angle of 90°, which is one of the advanced angles for no torque, such that the magnetic flux φm produced by the permanent magnet 26 and the magnetic flux φc produced by the coil 30 are in opposite directions and a combined magnetic flux φs, i.e., a combination of the magnetic flux φm and the magnetic flux φc, is smaller. Then, as shown in FIGS. 5 and 6, the coil 30 is energized in second one-half ½·Tpd of the given periodic cycle Tpd by an electric current having a value I2a at an advanced angle of 270° (−90°, which is another advanced angle for no torque, such that the magnetic flux φm produced by the permanent magnet 26 and the magnetic flux φc produced by the coil 30 are in the same direction and the combined magnetic flux φs is greater. The magnitude of the electric current value I2a supplied at the advanced angle of 270° for the greater combined magnetic flux φs is set to be greater than the magnitude of the electric current value I1a supplied at the advanced angle of 90° for the smaller combined magnetic flux φs (I2a>I1a).

Figure 7:
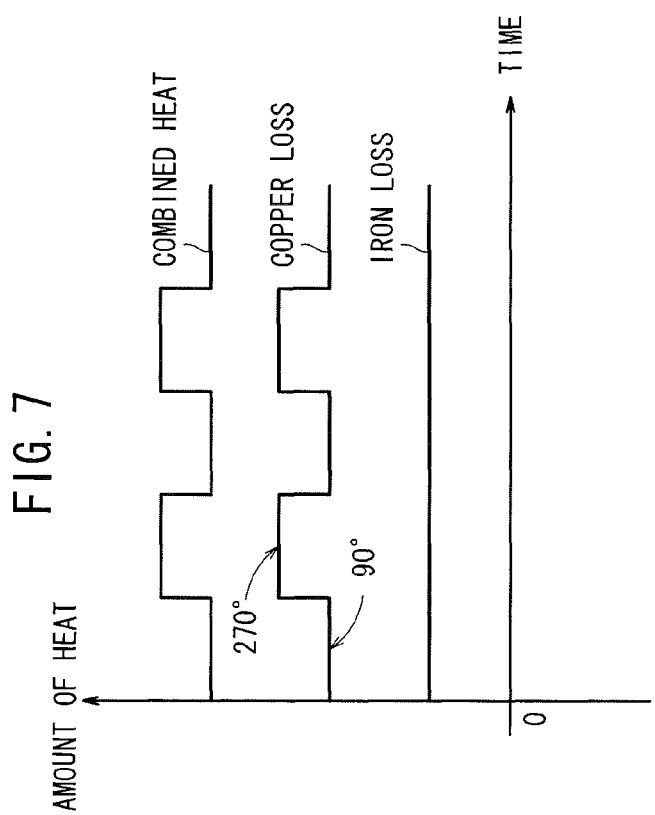
FIG. 7 is a graph illustrative of the amounts of heat generated when the electric currents are supplied according to the pattern shown in FIG. 6.

FIG. 7 illustrates the manner in which the amounts of heat generated by the motor 20 when the electric currents are supplied to the coil 30 alternately at the advanced angles of 90° and 270° according to the pattern shown in FIG. 6.

When the combined magnetic flux φs generated in the stator 32 changes, i.e., when the direction of the combined magnetic flux φs that passes through the stator core tooth 110 changes, the stator 32 causes an iron loss which heats the stator 32. At the same time, the electric currents having the values I1a, I2a supplied to the coil 30 cause a copper loss (Joule heat) in the coil 30, thereby heating the coil 30.

Since the magnitude of the electric current value I2a supplied at the advanced angle of 270° is greater than the magnitude of the electric current value I1a supplied at the advanced angle of 90°, the copper loss is greater during the period in which the coil 30 is energized by the electric current value I2a supplied at the advanced angle of 270° than during the period in which the coil 30 is energized by the electric current value I1a supplied at the advanced angle of 90°. As shown in FIG. 7, the combined amount of heat is represented by the sum of the iron loss and the copper loss.

According to the first example of the embodiment of the present invention, as described above, before the electric vehicle 10 is started, each of the coils 30 of the motor 20 is energized alternately by a first electric current having the value I1a at the advanced angle of 90° for no torque and a second electric current having the value I2a at the advanced angle of 270° for no torque. Therefore, the coils 30 immersed in the oil 100 are heated by the copper loss thereof and the stator core teeth of the stator 32 immersed in the oil 100 are heated by the iron loss thereof. The coils 30 and the stator core teeth 110 thus heated are jointly effective to heat the oil 100 quickly. Thus, the oil 100 can be heated quickly with a higher oil temperature increasing efficiency. Usually, the upper temperature limit of the coils 30 is of about 200° C., whereas the upper temperature limit of the stator core teeth is higher. Accordingly, it is preferable to heat the stator core teeth in terms of the protection and longer service life of the motor 20.

The electric current value I1a supplied to the coil 30 at the advanced angle of 90° generates the magnetic flux φc in the opposite direction to the magnetic flux φm generated by the permanent magnet 26, and the electric current value I2*a* supplied to the coil 30 at the advanced angle of 270° (field strengthening phase) generates the magnetic flux φc in the same direction as the magnetic flux φm generated by the permanent magnet 26. As the electric current value I2*a* is greater than the electric current value I1*a*, the permanent magnet 26 is prevented from being demagnetized.

The ECU 60 detects, in step S6, whether or not the motor 20 is in a state prior to being started, by the parking brake switch 70 or the shift position detecting switch 72, i.e., by determining whether or not the parking brake switch 70 indicates that the parking brake lever is operated or whether or not the shift position detecting switch 72 indicates the parking position P. In combination with the parking brake switch 70 and the shift position detecting switch 72, the ECU 60 serves as a decision unit for determining whether the motor 20 is in a state prior to being started or not. Thus, the ECU 60 can determine reliably whether the motor 20 is in a state prior to being started or not. Therefore, the process of controlling a temperature rise of the oil 100 can be performed while the electric vehicle 10 is being reliably stopped. The ECU 60 may detect whether or not the motor 20 is in a state prior to being started also by determining whether or not the battery 82 is being charged by the external charging unit 12 or whether or not the stator 32 of the motor 20 is not generating a rotating magnetic field.

When the electric current values I1*a*, I2*a* are supplied to the coils 30 at the advanced angles of 90° and 270°, the motor 20 produces no torque (0 N·m). However, the rotor 28 may be positioned out of phase with the stator 32 due to an error in the detection of the position of the magnetic poles of the rotor 28, thereby producing a slight rotational torque. Even when the rotor 28 is positioned out of phase with the stator 32, the electric vehicle 10 is prevented from moving on its own if the parking brake lever is in operation or the transmission shift lever is in the parking position P.

If the oil temperature To is kept equal to or higher than the prescribed temperature Tp because little time has elapsed since the last use, then since no process of heating the oil 100 is carried out, the electric power is not unduly consumed on the electric vehicle 10.

Furthermore, the motor and gear assembly 24 is prevented from being overheated as the oil temperature To and the coil temperature Tc are monitored.

The timer setting unit 104 is provided in order to set a time to start the electric vehicle 10. If the timer setting unit 104 has set a next time (next planned start time) to start the electric vehicle 10, then the ECU 60 energizes the coils 30 to equalize the oil temperature To to the prescribed temperature Tp at the next planned start time. In other words, the ECU 60 starts to energize the coils 30 if the answers to step S7 are affirmative. Consequently, the electric power required to increase the oil temperature To is efficiently consumed. Stated otherwise, the oil temperature To is not increased at all times when the battery 82 is charged, but temperature rise of the oil 100 is controlled such that control thereof is finished immediately before the electric vehicle 10 is used next time. Therefore, the electric power required by the process of controlling a temperature rise of the oil 100 can be saved.

2nd EXAMPLE

Figure 8:
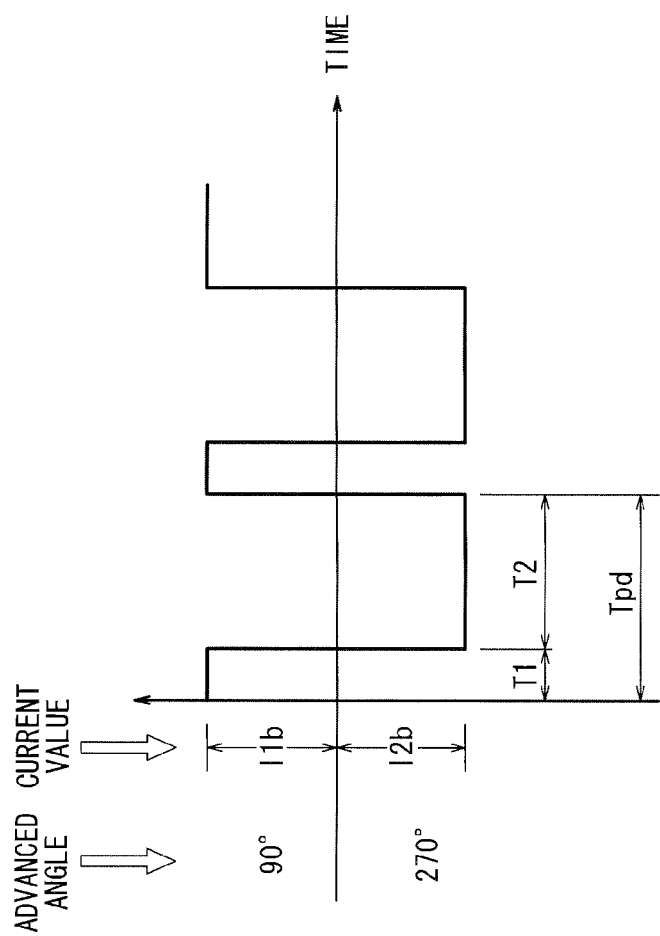
FIG. 8 is a graph illustrative of the manner in which the coil is alternately supplied with electric currents of the same value at respective advanced angles of 90° and 270° at different duty ratios.
Figure 9:
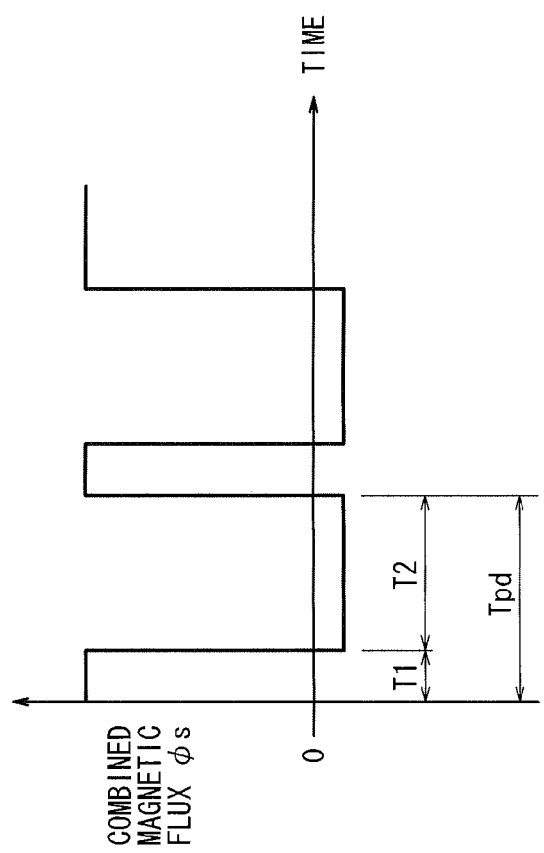
FIG. 9 is a graph illustrative of the manner in which a combined magnetic flux changes according to the pattern shown in FIG. 8.

In FIG. 4, when the electric current I1*a* is supplied to the coil 30 at the advanced angle of 90°, the coil 30 generates the magnetic flux φc in the opposite direction to the magnetic flux φm generated by the permanent magnet 26, i.e., in the direction to demagnetize the permanent magnet 26. According to a second example, as shown in FIGS. 8 and 9, an electric current value I1*b* is supplied to the coil 30 at the advanced angle of 90° for a period T1 to generate the magnetic flux φc in the opposite direction to the magnetic flux φm generated by the permanent magnet 26, and an electric current value I2*b* (=I1*b*) is supplied to the coil 30 at the advanced angle of 270° for a period T2 longer than the period T1 (T1+T2=Tpd) to generate the magnetic flux φc in the same direction as the magnetic flux φm generated by the permanent magnet 26. Since the period T2 is longer than the period T1, the permanent magnet 26 is prevented from being unduly demagnetized, and the stator 32 is heated by an iron loss thereof.

According to the first and second examples, in the electric vehicle 10 whose battery 82 is charged by connecting a charging plug, i.e., the connector 86, to the external charging unit 12, the electric current based on the electric power supplied from the external charging unit 12 is supplied to the coils 30 of the motor 20 alternately at the advanced angles of 90° and 270° to cause the coils 30 to be heated due to a copper loss thereof and also to cause the stator core teeth 110 to be heated due to an iron loss thereof. The coils 30 and the stator core teeth 110 thus heated are jointly effective to quickly heat the oil 100, which functions as a lubricating oil for the motor and gear assembly 24. Since the oil 100 is heated before the electric vehicle 10 is started to operate, the friction caused by the oil 100 is much lower than if the oil 100 is not heated when the electric vehicle 10 is started to operate. As a consequence, the mileage of the electric vehicle 10 is increased.

According to the present embodiment, if the timer setting unit 104 sets a next planned start time, the coils 30 are energized to equalize the oil temperature To to the prescribed temperature (and also to fully charge the battery 82) at the set next planned start time. Therefore, the electric power in the battery 82, or the electric power from the external AC power supply 98 if it is connected, which is required to increase the oil temperature To is minimized and hence can efficiently be consumed.

Although certain preferred embodiments of the present invention have been shown and described in detail, it should be understood that various changes and modifications may be made therein without departing from the scope of the appended claims.

What is claimed is:

1. A method of controlling an oil temperature increase for an electric vehicle which employs an oil commonly used as a lubricating oil for gears and a coolant for a motor and which is propelled by transmitting a rotational torque of the motor to wheels through the gears, the method comprising the steps of:

determining whether the motor is in a state prior to being started or not; and if it is judged that the motor is in the state prior to being started, energizing coils of the motor alternately with a first current supplied to the motor at an advanced angle for no torque to generate a magnetic flux, and a second current supplied to the motor at another advanced angle for no torque to generate a magnetic flux in a direction which is different from the magnetic flux generated by the first current, wherein a timer is further provided for setting a start time to start the electric vehicle, and if the timer sets a next start time to start the electric vehicle, the coils are energized so as to equalize the temperature of the oil to a proper temperature at the set next start time, and wherein the electric vehicle is connected to an external charging unit before the electric vehicle is started to operate, and the first current and the second current are supplied from the external charging unit to the motor.

2. A method according to claim 1, wherein the motor comprises a three-phase permanent-magnet synchronous motor, and the advanced angle at which the first current is supplied is 90° and the other advanced angle at which the second current is supplied is 270°.

3. A method according to claim 2, wherein the second current has a value greater than that of the first current, or a period for which the coils are energized with the second current at the other advanced angle of 270° is longer than a period for which the coils are energized with the first current at the advanced angle of 90°.

4. A method according to claim 1, wherein it is judged that the motor is in the state prior to being started if a parking brake of the electric vehicle is in operation or a transmission of the electric vehicle is in a parking position.

5. An electric vehicle which employs an oil commonly used as a lubricating oil for gears and a coolant for a motor and which is propelled by transmitting a rotational torque of the motor to wheels through the gears, the electric vehicle incorporating a program for carrying out a method of controlling an oil temperature increase for the electric vehicle, the program enabling a computer to function as:

a decision unit for determining whether the motor is in a state prior to being started or not; and an energizing unit for, if it is judged that the motor is in the state prior to being started, energizing coils of the motor alternately with a first current supplied to the motor at an advanced angle for no torque to generate a magnetic flux, and a second current supplied to the motor at another advanced angle for no torque to generate a magnetic flux in a direction which is different from the magnetic flux generated by the first current, wherein a timer is further provided for setting a start time to start the electric vehicle, and if the timer sets a next start time to start the electric vehicle, the coils are energized so as to equalize the temperature of the oil to a proper temperature at the set next start time, and wherein the electric vehicle is connected to an external charging unit before the electric vehicle is started to operate, and the first current and the second current are supplied from the external charging unit to the motor.

6. An apparatus for controlling an oil temperature increase for an electric vehicle which employs an oil commonly used as a lubricating oil for gears and a coolant for a motor and which is propelled by transmitting a rotational torque of the motor to wheels through the gears, the apparatus comprising:

a decision unit for determining whether the motor is in a state prior to being started or not; and an energization controller for, if it is judged that the motor is in the state prior to being started, energizing coils of the motor alternately with a first current supplied to the motor at an advanced angle for no torque to generate a magnetic flux, and a second current supplied to the motor at another advanced angle for no torque to generate a magnetic flux in a direction which is different from the magnetic flux generated by the first current, wherein a timer is further provided for setting a start time to start the electric vehicle, and if the timer sets a next start time to start the electric vehicle, the coils are energized so as to equalize the temperature of the oil to a proper temperature at the set next start time, and wherein the electric vehicle is connected to an external charging unit before the electric vehicle is started to operate, and the first current and the second current are supplied from the external charging unit to the motor.

* * * * *

UNITED STATES PATENT AND TRADEMARK OFFICE
CERTIFICATE OF CORRECTION

| | |
|---|---|
| PATENT NO. | : 8,604,738 B2 |
| APPLICATION NO. | : 12/911319 |
| DATED | : December 10, 2013 |
| INVENTOR(S) | : Daijiro Takizawa |

Page 1 of 1

It is certified that error appears in the above-identified patent and that said Letters Patent is hereby corrected as shown below:

On the title page item 75 the inventors residence information should be listed as:

--Daijiro Takizawa, Utsunomiya (JP)--

Signed and Sealed this
First Day of July, 2014

Michelle K. Lee
*Deputy Director of the United States Patent and Trademark Office*